(12) United States Patent
Tione et al.

(10) Patent No.: US 10,538,229 B2
(45) Date of Patent: Jan. 21, 2020

(54) ELECTRO-PNEUMATIC ASSEMBLY, PARTICULARLY FOR A PNEUMATIC BRAKING INSTALLATION FOR RAILWAY VEHICLES

(71) Applicant: FAIVELEY TRANSPORT ITALIA S.p.A., Piossasco (Turin) (IT)

(72) Inventors: Roberto Tione, Lauriano (IT); Andrea Cavazzin, Turin (IT); Angelo Grasso, Canelli (IT)

(73) Assignee: FAIVELEY TRANSPORT ITALIA S.P.A., Piossasco (Turin) (IT)

( * ) Notice: Subject to any disclaimer, the term of this patent is extended or adjusted under 35 U.S.C. 154(b) by 199 days.

(21) Appl. No.: 15/524,053

(22) PCT Filed: Nov. 12, 2015

(86) PCT No.: PCT/IB2015/058730
§ 371 (c)(1),
(2) Date: May 3, 2017

(87) PCT Pub. No.: WO2016/075642
PCT Pub. Date: May 19, 2016

(65) Prior Publication Data
US 2018/0297570 A1 Oct. 18, 2018

(30) Foreign Application Priority Data

Nov. 13, 2014 (IT) .............................. TO2014A0945

(51) Int. Cl.
*B60T 13/66* (2006.01)
*B60T 13/68* (2006.01)
(Continued)

(52) U.S. Cl.
CPC .......... *B60T 13/665* (2013.01); *B60T 13/683* (2013.01); *B61H 13/34* (2013.01); *F15B 1/024* (2013.01); *F15B 1/033* (2013.01); *F15B 2201/51* (2013.01)

(58) Field of Classification Search
CPC ........ B60T 13/683; B60T 13/68; B60T 13/66; F16B 1/024; F16B 1/033; F16B 2201/51
See application file for complete search history.

(56) References Cited

U.S. PATENT DOCUMENTS 5,458,404 A * 10/1995 Fennel ................... B60K 28/16
303/122
5,494,342 A * 2/1996 Engle ................... B60T 13/585
303/15

(Continued)

FOREIGN PATENT DOCUMENTS

EP  0958980 A2  11/1999
WO  2013/182558 A2  12/2013

OTHER PUBLICATIONS

International Search Report for PCT/IB2015/058730, dated Feb. 17, 2016.

*Primary Examiner* — Bradley T King
*Assistant Examiner* — James K Hsiao
(74) *Attorney, Agent, or Firm* — Arent Fox LLP; Michael Fainberg (57) ABSTRACT

The assembly comprises a body wherein there are defined a chamber, a supply valve adapted to connect the chamber to a pressure source or to the atmosphere, and a vent valve adapted to allow or prevent the connection of the chamber to the atmosphere. The valves are provided with control solenoids to which respective electronic switches are coupled. The assembly also comprises electronic control devices adapted to provide, as a function of the values of at least one input signal, logic control signals to the electronic (Continued)

switches so as to control, through the valves, the value of the pressure in the chamber. The control means comprise two processing and control devices independent of one another, both receiving the input signal and designed to execute strategies for controlling the pressure in the chamber, equivalent to one another.

12 Claims, 9 Drawing Sheets

(51) Int. Cl.
  *B61H 13/34* (2006.01)
  *F15B 1/02* (2006.01)
  *F15B 1/033* (2006.01)

(56) References Cited

U.S. PATENT DOCUMENTS

| | | | | |
|---|---|---|---|---|
| 5,590,042 A * | 12/1996 | Allen, Jr. | B60T 13/665 | 246/182 B |
| 5,630,565 A * | 5/1997 | Lumbis | B60T 13/665 | 246/182 B |
| 5,681,015 A * | 10/1997 | Kull | B60T 13/665 | 246/187 C |
| 5,722,736 A * | 3/1998 | Cook | B60T 13/665 | 303/15 |
| 5,808,370 A * | 9/1998 | Bezos | B60T 13/665 | 191/11 |
| 5,924,774 A * | 7/1999 | Cook | B60T 17/228 | 303/115.2 |
| 5,927,823 A * | 7/1999 | Dimsa | B60T 13/665 | 303/15 |
| 5,975,651 A * | 11/1999 | Bezos | B60T 17/228 | 303/20 |
| 5,984,426 A * | 11/1999 | Hart | B60T 13/665 | 303/15 |
| 6,024,419 A * | 2/2000 | Waldrop | B60T 13/665 | 303/15 |
| 6,474,748 B1 * | 11/2002 | Cunkelman | B60T 11/326 | 303/15 |
| 9,751,513 B2 * | 9/2017 | Dewberry | B60T 15/60 | |
| 2002/0163248 A1 * | 11/2002 | Wood | B60T 8/1881 | 303/128 |
| 2005/0057352 A1 * | 3/2005 | Stockhausen | B60T 7/16 | 340/500 |
| 2005/0099061 A1 * | 5/2005 | Hollandsworth | B60T 13/662 | 303/7 |
| 2007/0063578 A1 * | 3/2007 | Reynolds | B60T 15/48 | 303/7 |
| 2010/0078991 A1 * | 4/2010 | Maischak | B60T 8/00 | 303/168 |
| 2011/0089755 A1 * | 4/2011 | Itano | B60T 8/1893 | 303/14 |
| 2012/0192757 A1 * | 8/2012 | Schiffers | B60T 8/3235 | 105/1.4 |
| 2013/0018560 A1 * | 1/2013 | Smith | B60T 13/665 | 701/70 |
| 2013/0221735 A1 * | 8/2013 | Kiel | B60T 13/662 | 303/15 |
| 2013/0261857 A1 * | 10/2013 | Matsuyama | B60T 8/1705 | 701/19 |
| 2014/0319904 A1 * | 10/2014 | Watanabe | B60T 13/665 | 303/119.1 |
| 2014/0345491 A1 * | 11/2014 | Scharpf | B60L 7/24 | 105/1.4 |
| 2015/0083529 A1 * | 3/2015 | Tione | B61C 17/12 | 188/34 |
| 2017/0169976 A1 * | 6/2017 | Kanner | B60M 3/04 | |

* cited by examiner

ELECTRO-PNEUMATIC ASSEMBLY, PARTICULARLY FOR A PNEUMATIC BRAKING INSTALLATION FOR RAILWAY VEHICLES

CROSS-REFERENCE TO RELATED APPLICATIONS

This application is a National Stage entry of International Application No. PCT/IB2015/058730, filed Nov. 12, 2015, which claims priority to Italian Patent Application No. TO2014A000945, filed Nov. 13, 2014. The disclosures of these priority applications are incorporated in their entirety herein by reference.

TECHNICAL FIELD

The present invention relates in a general way to an electro-pneumatic assembly, and in particular to an assembly for use in a pneumatic braking installation of a railway vehicle or train.

BACKGROUND

Existing braking systems for railway vehicles generally comprise electro-pneumatic assemblies controlled by electronic units of the microprocessor type. The design of these braking systems is governed by specific standards (in Europe, for example, the EN 50126 standard relating to system definition, the EN 50128 standard concerning software design and development, and the EN 50129 standard relating to hardware specifications and design). These standards introduced the concept of "Safety Integrity Level" (SIL hereafter) which defines the degree of reduction of risk to human safety that can be associated with a given function relating to a braking installation.

A braking installation for railway vehicles is designed to execute a plurality of functions, for example (but not only) service braking, parking braking, safety braking, emergency braking, braking correction in case of wheel sliding or locking (wheel slide protection), and holding braking.

A different SIL level is required for each of these functions: in particular, the emergency braking and safety braking functions must be implemented with safety levels in the range from SIL=3 to SIL=4, with reference to a scale running from a minimum of SIL=0 to a maximum of SIL=4.

In the present state of the art, purely mechanical-pneumatic solutions are used in virtually all cases to execute the emergency braking and safety braking functions, since these solutions enable the requisite SIL levels to be reached and verified in a convenient manner.

Figure 1:
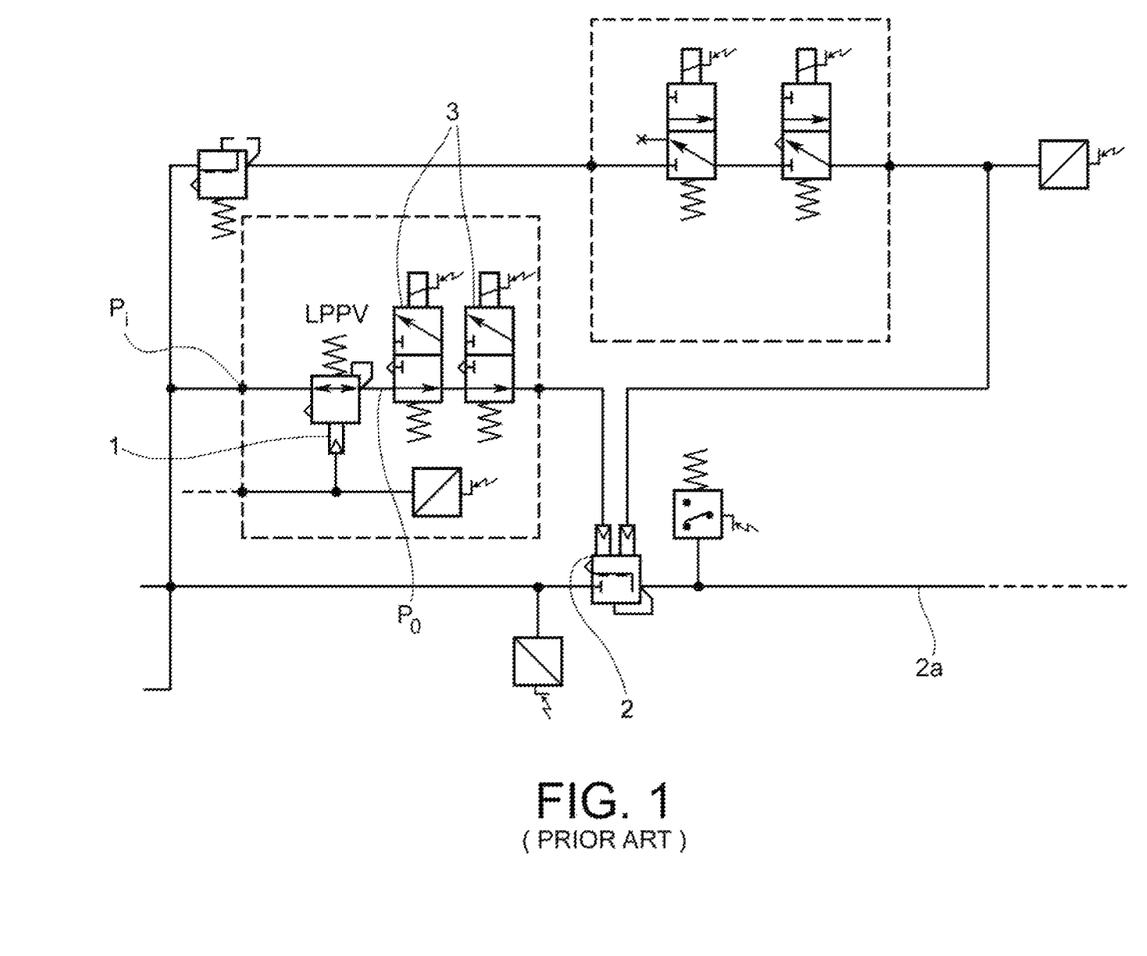
FIG. 1, described above, is a diagram of an electro-pneumatic braking system for railway vehicles according to the prior art.

FIG. 1 of the attached drawings shows, by way of example, an electro-pneumatic braking installation for railway vehicles according to the prior art, in which the safety braking pressure is determined by a valve 1, commonly known as an LPPV (Load Proportional Pressure Valve). This valve is used to generate a braking pressure proportional to the detected weight of the railway vehicle (or of a part thereof, for example a bogie), in order to provide the greatest possible deceleration within the limits of wheel-to-rail adhesion defined at the design stage. The valve, various implementations of which are known, executes a transfer function of the type shown in qualitative terms in FIG. 2, where the pressure $P_i$ at the input of the valve 1 is shown on the horizontal axis, and the pressure $P_o$ at the output of this valve is shown on the vertical axis. According to FIG. 2, when the pressure $P_i$ varies between a value $P_{tare}$ and a maximum value $P_{imax}$, the output pressure $P_o$ varies between a minimum value $P_{omin}$ and a maximum value $P_{omax}$, along a straight line characterized by a slope angle α. Additionally, when the pressure $P_i$ varies between $P_{tare}$ and 0, the output pressure $P_o$ varies between the value $P_{omin}$ and an intermediate value $P^*_o$, according to a straight line characterized by a slope angle β. The pressure $P^*_o$ is such that the vehicle is always braked if a fault occurs in the suspension, such that an excessively low pressure value is caused, as shown in the broken-line continuation of the straight line having the slope α.

With reference to FIG. 1 again, the pressure $P_o$ at the output of the valve 1 is sent (for example) to the control chamber of a relay valve 2, through one or more solenoid safety valves 3. These solenoid valves 3 are normally in the state of pneumatic conduction when de-energized, and are energized by a safety loop of the braking system. Safety braking is applied by de-energizing the safety loop, the pressure $P_o$ from the output of the valve 1 then being propagated by the control chamber of the relay valve 2, which amplifies its power, at its output 2a, towards the brake cylinder or cylinders (not shown).

The known solution described above is one of various possible solutions used to execute a braking function with a safety level equal to or greater than the SIL 3 level defined in the EN 50126 standard.

Although these solutions are satisfactory in terms of the safety level, they have considerable drawbacks due to the complexity and nature of the devices and components used, such as springs, rubber diaphragms, sealing rings, and the like. The use of these components has a negative effect on the accuracy of the functional characteristics provided, and on their repeatability when the operating temperature varies, in view of functional requirements which commonly specify operating temperature ranges from −40° C. to +70° C. Additionally, the provision of operating characteristics such as those shown in FIG. 2 by purely mechanical-pneumatic means requires complicated solutions, such as specific ratios between the rubber diaphragm surfaces and the spring loading, these ratios determining the slope angle α, β and the points of intersection of the straight lines with this Cartesian axes.

Also, with the known solutions of the purely mechanical-pneumatic type, it is substantially impossible to calibrate the operating characteristics on board a vehicle during the normal adjustment of the vehicle (during commissioning), and therefore, if the slopes α, β or the pressure values at the points of intersection of the straight lines with the Cartesian axes have to be varied, the ratios between the surfaces of the rubber diaphragms and the spring loadings must be completely replanned, which will obviously create delays in the adjustment of the vehicle.

Furthermore, the variation of the aforesaid functional characteristics due to the tolerances of the materials and the fluctuations caused by temperature variations and ageing results in a considerable lack of precision in the stopping distances of railway vehicles during emergency and/or safety braking.

It is also known that the use of microprocessor systems for the feedback control of pneumatic solenoid valves enables the characteristic function of the valve 1 described above to be reproduced conveniently, while providing much greater accuracy than that allowed by existing mechanical-pneumatic components, over a range of temperature and time variations, thus making the aforesaid stopping distances much more precise and repeatable. Moreover, certain characteristics such as the slopes α and β can be easily and rapidly modified simply by using software methods to reprogram parameters.

Figure 3:
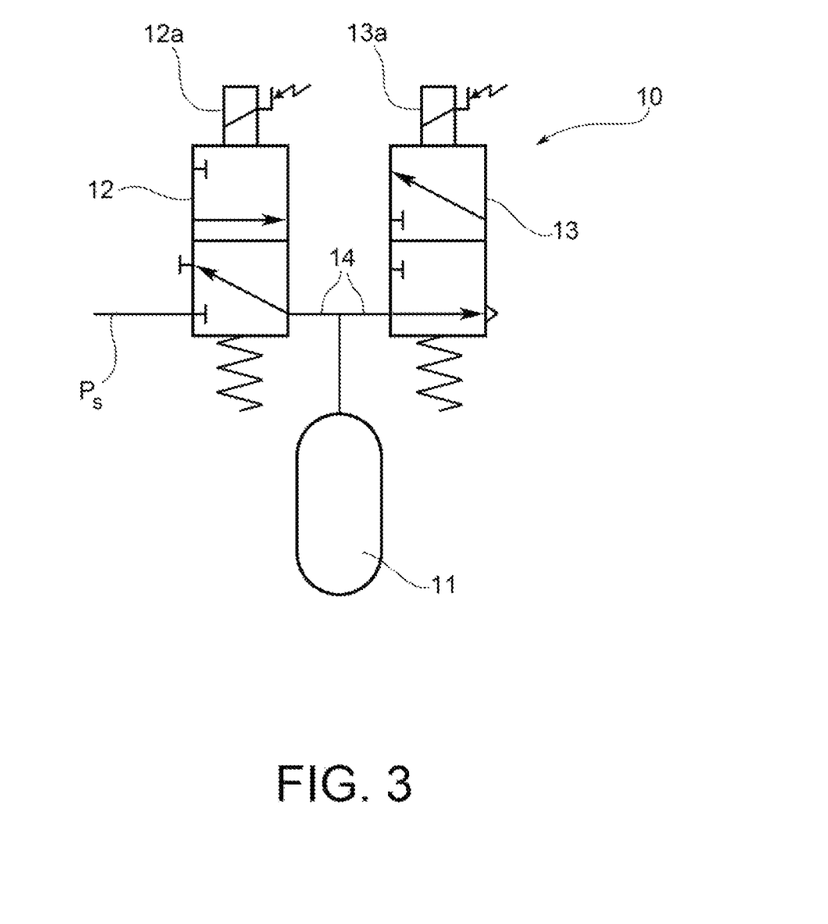
FIGS. 3 to 5, also described above, show three different embodiments of the pneumatic part, which is known, of an electro-pneumatic assembly according to the present invention.

FIG. 3 of the appended drawings shows an embodiment of an electro-pneumatic assembly 10 for controlling the pneumatic pressure in a chamber or volume 11, such as the volume of a brake cylinder, or the control chamber of a relay valve which controls the supply of pressure to the volume of a brake cylinder. This assembly 10 comprises a solenoid supply or filling valve 12 adapted to connect the chamber 11 selectively to a pressure source $P_S$ or to the atmosphere, and a vent or discharge valve 13 adapted to allow or selectively prevent the connection of the chamber 11 to the atmosphere. The solenoid valves 12 and 13 are provided with respective control solenoids 12a, 13a to which respective electronic switches are coupled in the manner described below.

The chamber or volume 11 is connected to a conduit 14 which connects the output of the solenoid valve 12 to the input of the solenoid valve 13.

When the solenoids 12a and 13a of the solenoid valves 12 and 13 are de-energized, these solenoid valves appear in the condition shown in FIG. 3: the volume or chamber 11 is connected to the atmosphere, and the pressure within it is reduced to the value of atmospheric pressure.

When the solenoid valves 12 and 13 are both energized, the first valve supplies the chamber 11 with a flow of air taken from the pressure source, while the second valve disconnects the chamber 11 from the atmosphere. Thus the pressure in the chamber 11 is increased.

When the solenoid valve 12 is de-energized and the solenoid valve 13 is energized, the chamber 11 is disconnected both from the pressure source and from the atmosphere, and the pressure within it remains substantially unchanged.

The behaviour of the electro-pneumatic assembly 10 of FIG. 3 with the variation of the conditions of energizing and de-energizing of the solenoids 12a and 13a is summarized in Table 1 below.

TABLE 1

| 12a | 13a | Pressure in 11 |
|---|---|---|
| 0 | 0 | DECREASE |
| 0 | 1 | MAINTENANCE |
| 1 | 1 | INCREASE |
| 1 | 0 | — |

0 = de-energized
1 = energized
— = condition not used

By suitably modulating the energizing conditions or states of the solenoid valves 12 and 13 shown in Table 1, it is possible to produce and maintain in the volume or chamber 11 any value of pressure between the pressure $P_S$ of the source and atmospheric pressure $P_{atm}$.

Figure 4:
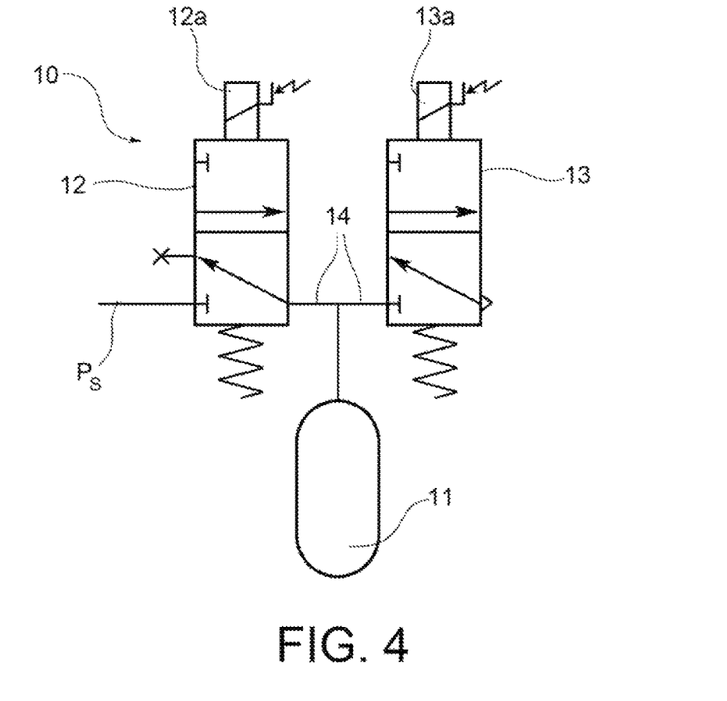
Figure 5:
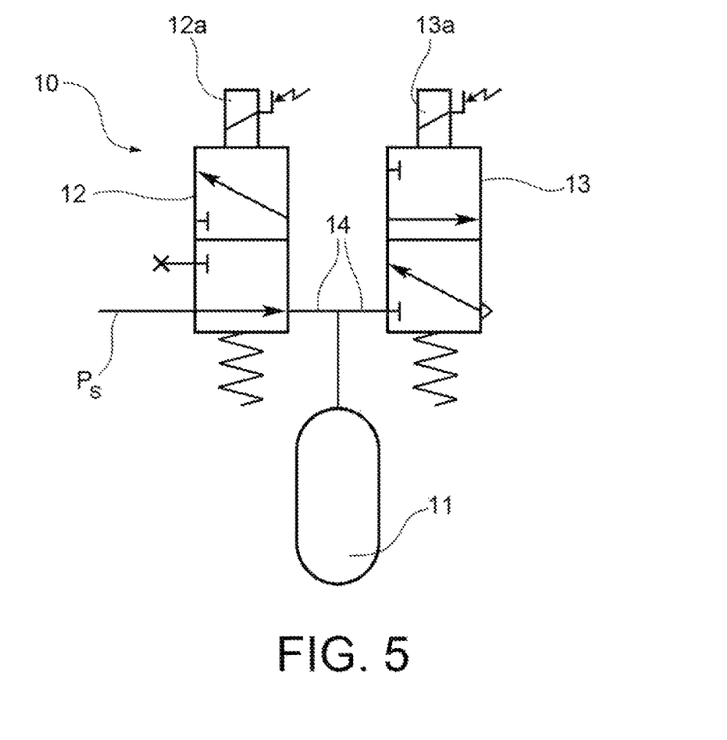

FIGS. 4 and 5 show variant embodiments of the electro-pneumatic assembly 10. In these figures, parts and elements identical or corresponding to those described previously have been given the same reference numerals as those used previously.

The mode of operation of the electro-pneumatic assemblies 10 of FIGS. 4 and 5 can be summarized as shown in Tables 2 and 3 below.

TABLE 2

| 12a | 13a | Pressure in 11 |
|---|---|---|
| 0 | 0 | MAINTENANCE |
| 0 | 1 | DECREASE |
| 1 | 0 | INCREASE |
| 1 | 1 | — |

TABLE 3

| 12a | 13a | Pressure in 11 |
|---|---|---|
| 0 | 0 | INCREASE |
| 1 | 0 | MAINTENANCE |
| 1 | 1 | DECREASE |
| 0 | 1 | — |

Once again, in the case of the electro-pneumatic assemblies 10 of FIGS. 4 and 5, by suitably modulating the energizing conditions or states of the solenoid valves 12 and 13 it is possible to produce and maintain in the volume or chamber 11 any value of pressure between $P_S$ and $P_{ATM}$.

Figure 6:
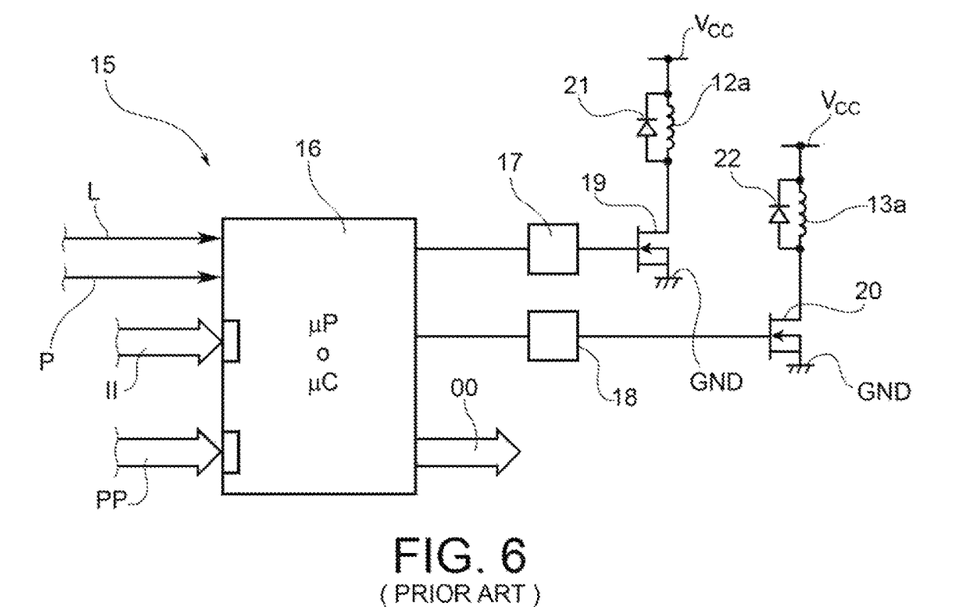
FIG. 6, also described above, is a block diagram of a control system for an electro-pneumatic assembly according to the prior art.

FIG. 6 shows, in the form of a block diagram, an electronic control system 15 according to the prior art, for controlling an electro-pneumatic assembly according to one of FIGS. 3 to 5. This system 15 essentially comprises a processing and control unit 16, of the microprocessor or microcontroller type, which receives at an input a signal L containing information on the weight of the vehicle (or of a single bogie of the vehicle), for example the instantaneous value of the pressure $P_i$ shown on the horizontal axis of FIG. 2.

At another input, the unit 16 receives a signal P representing the pneumatic pressure within the volume or chamber 11, detected by means of a suitable sensor. The unit 16 may receive further signals or input data II, which are not essential for the purposes of the present description.

By means of bias circuits 17 and 18, the unit 16 controls corresponding solid-state electronic switches 19 and 20, such as p-channel MOS transistors or simple NPN transistors, which control the energizing/de-energizing condition of the solenoids 12a and 13a respectively, in parallel with which respective recirculation diodes 21 and 22 may be connected. In the control system 15 of FIG. 6, the electronic switches 19 and 20 are connected in series with the windings 12a and 13a, between a d.c. power source $V_{cc}$ and the earth GND.

The unit 16 may if necessary supply further output signals OO, relating to other processes not essential for the purposes of the present description.

Figure 2:
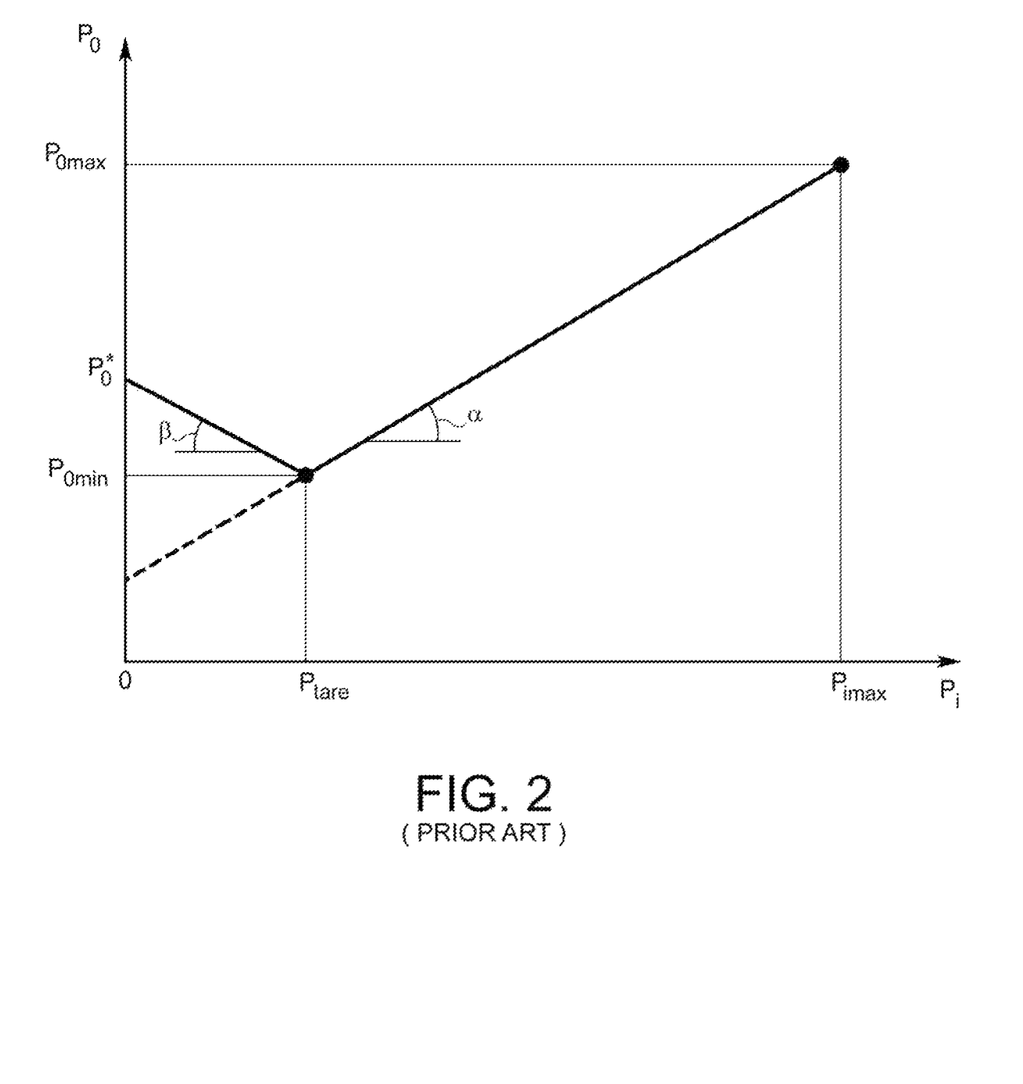
FIG. 2, also described above, shows a characteristic of a valve for controlling the pressure proportionally to the load.

By implementing suitable closed-loop control algorithms, for example PID algorithms, "fuzzy" algorithms, or algorithms of the on-off type with hysteresis (also known as "bangbang" control algorithms), the unit 16 can be designed to provide the characteristic shown in the diagram of FIG. 2, in such a way that the pressure in the container or volume 11 corresponds to the pressure $P_o$ in this diagram. For this purpose, the unit 16 receives, through an input port, the values of a set of parameters PP which characterize the control algorithm. The values of these parameters are stored in a non-volatile memory of the unit 16.

As an alternative to the implementation shown schematically in FIG. 6, the solenoids 12a and 13a may be connected to the earth GND, while the associated switches 19 and 20 may be connected to the d.c. power source. In this case, the switches 19 and 20 can be n-channel MOS transistors or PNP transistors.

In view of the EN 50126, EN 50128 and EN 50129 standards, if the function implemented by the unit 16, for example the pressure characteristic according to the diagram of FIG. 2, requires a safety level equivalent to SIL 3 or SIL 4, then, since the unit 16 is the only device contributing to the execution of this safety function, the corresponding software must also be implemented with a process having a safety level of SIL 3 or SIL 4, as specified, in particular, in the EN 50128 standard. However, this software implementation process is characterized by extremely high organizational, financial and maintenance-related costs, which frequently make its use less attractive by comparison with the more conventional mechanical-pneumatic systems, even though these suffer from all the aforementioned drawbacks.

SUMMARY

In view of the above, one object of the present invention is to provide an electro-pneumatic assembly, particularly for a pneumatic braking installation of a railway vehicle or train, the control system of which can be used to execute, in a simple and relatively economical way, a function with a predetermined safety level, for example equal to or greater than the SIL 3 level.

This and other objects are achieved according to the invention with an electro-pneumatic assembly of the type described above, characterized in that the aforesaid electronic control means comprise first and second electronic processing and control devices independent of one another, both receiving the aforesaid at least one input signal and designed to execute strategies for controlling the pressure in said chamber, equivalent to one another; said first and second electronic processing and control devices each being coupled to the control solenoids of the solenoid supply valve and the solenoid vent valve through respective first and second electronic switches;

the first electronic switches and the second electronic switches, respectively, associated with said first and second electronic processing and control device being coupled to one another in a predetermined manner, so as to form together an enabling logic circuit designed to drive the solenoids of said solenoid valves in such a way that when the logic control signals provided by said first and second electronic processing and control device conflict with one another, the logic control signals that are actuated are those supplied by the electronic processing and control device which tends to produce in said chamber a pressure whose value complies with a predetermined relationship compared with the value which would be produced as a result of the logic control signals supplied by the other electronic processing and control device.

BRIEF DESCRIPTION OF DRAWINGS

Other characteristics and advantages of the invention will be apparent from the following detailed description, which is given purely by way of non-limiting example, with reference to the attached drawings, in which.

DETAILED DESCRIPTION OF THE INVENTION

Figure 7:
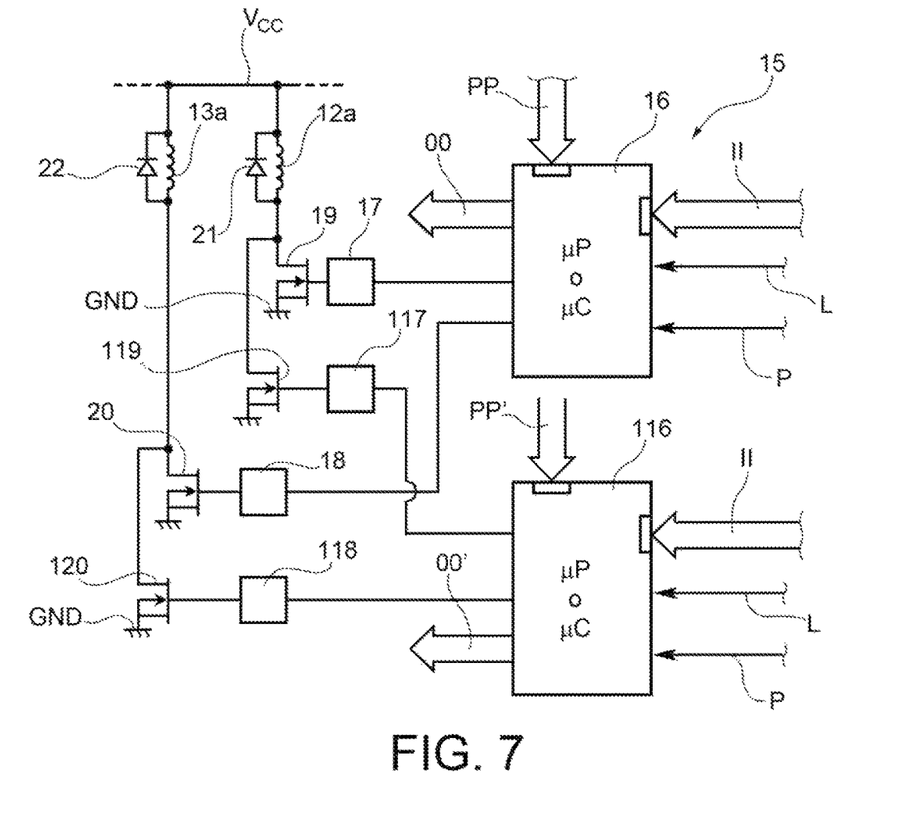
FIGS. 7 to 12 are circuit diagrams, partially in block form, showing various embodiments of the control system for an electro-pneumatic assembly according to the present invention.

In the appended drawings, FIG. 7 shows a possible embodiment of a control system for an electro-pneumatic assembly according to the present invention, adapted to execute (for example) a pneumatic function on the basis of which a value of pneumatic pressure equal to or greater than a predetermined target, for example according to the characteristic shown in FIG. 2, is produced in the volume or chamber 11 of the assembly according to FIG. 3.

The system according to FIG. 7 comprises two electronic processing and control units 16 and 116, constructed for example in the form of microprocessor or microcontroller units, independent of one another. These units 16, 116 are made, for example, in the form of physical devices which differ from one another, and are designed to execute control strategies which are equivalent to one another, although they are implemented using corresponding software packages which are independent of, and generally different from, one another.

The same input signals L, P and II as those defined above are supplied to the units 16 and 116, together with respective data PP and PP' representing the values of parameters of the respective algorithms implemented in them. The units 16 and 116 also supply respective output signals OO and OO'.

As in the system according to FIG. 6, the unit 16 is designed to drive, through respective bias circuits 17 and 18, the electronic switches 19 and 20 which are essentially connected in series with the respective energizing solenoids 12*a* and 13*a* of the solenoid valves 12 and 13.

In turn, the electronic unit 116 has two outputs for driving, through bias circuits 117 and 118, corresponding electronic switches 119 and 120, connected, respectively, in parallel with the switches 19 and 20, between the earth GND and the energizing solenoids 12*a* and 13*a*.

In the diagram according to FIG. 7, the electronic switches 19, 20, 119 and 120 are coupled to one another so as to form together an enabling logic circuit designed to drive the solenoids 12*a* and 13*a* in such a way that:

when the logic control signals sent to these switches by the control units 16 and 116 are in agreement with one another, the energizing of the solenoids 12*a* and 13*a* of the solenoid valves 12 and 13 enables the pressure in the volume or chamber 11 to be controlled in accordance with Table 1 above, in such a way that the pressure in this volume or chamber 11 conforms (for example) to the characteristic shown in FIG. 2; and conversely, when the logic control signals sent by the units 16 and 116 towards the associated switches 19, 20 and 119, 120 conflict with one another, the logic control signals that are executed are those supplied by the unit 16 or 116 which tends to produce the greater pressure in said volume or chamber 11.

The behaviour of the system according to FIG. 7 in the case of conflict between the logic signals sent by the units 16 and 116 is easily understood from the following description. The solenoid 12a (13a) can be energized according to a logical OR function of the states of the switches 19 and 119 (20 and 120).

With reference to Table 1, it can be seen that, if one of the two units 16 and 116, using the associated electronic switches, tends to set the condition of pressure decrease in the chamber or volume 11, while the other unit 116 or 16 tends to set the condition of pressure maintenance, then, as a result of the OR connection between the switches 19 and 119 and between the switches 20 and 120 respectively, the condition of pressure maintenance will prevail.

Similarly, when one of the units tends to set the condition of pressure increase while the other unit tends to set the condition of maintenance, then, again as a result of the OR connection between the switches 16 and 119 and between the switches 20 and 120 respectively, the condition of pressure increase will prevail.

Additionally, the condition of pressure increase will also prevail over the condition of pressure decrease.

Consequently, the system according to FIG. 7 can be used to execute a pneumatic function adapted to produce, in the volume or chamber 11 of FIG. 3, a value of pressure equal to or greater than a predetermined target value.

Figure 8:
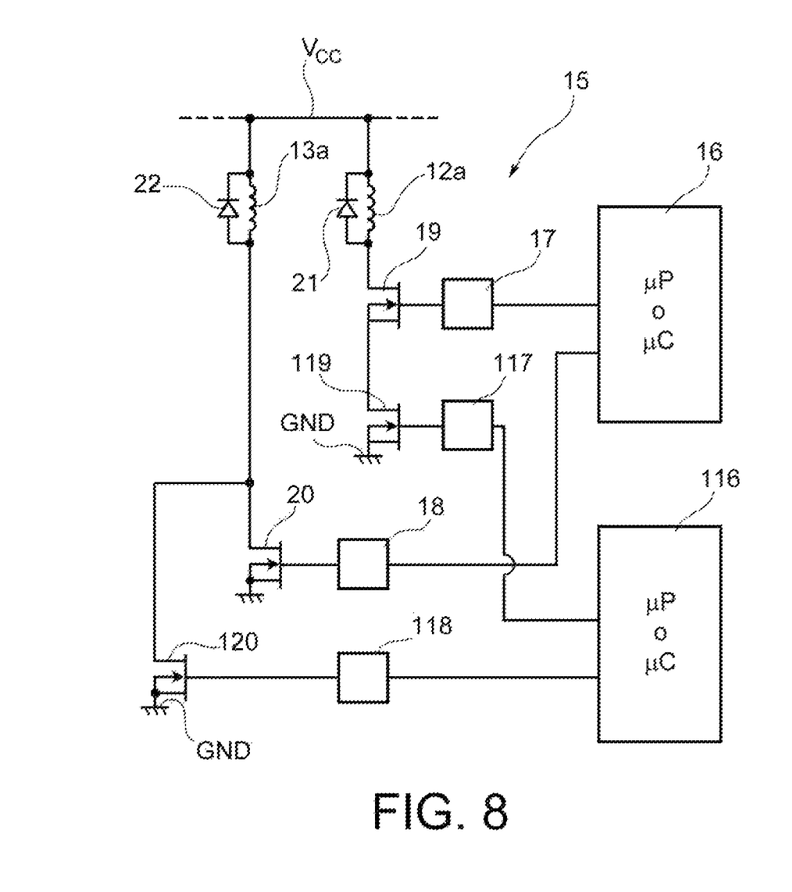

FIG. 8 shows the architecture of a control system for an electro-pneumatic assembly according to the present invention, the pneumatic part of which conforms to FIG. 4.

In electrical terms, the diagram of FIG. 8 differs from that of FIG. 7 in that the electronic switches 19 and 119 associated with the solenoids 12a of the solenoid valve 12 of FIG. 4 are connected in series with one another, between this solenoid 12a and the earth GND.

The valve arrangement according to FIG. 4 and the associated control system according to FIG. 8 are such that, when the logic control signals supplied by the control units 16 and 116 conflict with one another, the logic control signals that are executed are those supplied by the unit 16 or 116 which tends to produce the lower pressure in the volume or chamber 11 (of FIG. 4).

This is due to the fact that the solenoid valve arrangement according to FIG. 4 corresponds to Table 2 shown above, and is also due to the logical AND connection of switches 19 and 119 and the logical OR connection of switches 20 and 120.

Thus, with reference to Table 2, it can easily be seen that, if one control unit 16 or 116 tends to set the condition of pressure decrease in the chamber or volume 11 while the other unit 116 or 16 tends to set the condition of pressure maintenance, then, as a result of the AND connection between the switches 19 and 119, the condition of pressure decrease will prevail. Similarly, when one of the two units 16 and 116 tends to set the condition of pressure increase while the other unit 116 or 16 tends to set the condition of maintenance, then, as a result of the logical OR connection between the switches 20 and 120 and the logical AND connection between the switches 19 and 119, the condition of pressure maintenance will prevail. Finally, it can easily be seen that the condition of pressure maintenance, "commanded" by one of the two units, prevails over the condition of pressure increase "commanded" by the other unit.

Consequently, in an electro-pneumatic assembly whose pneumatic part 10 conforms to FIG. 4, and whose control architecture conforms to the diagram of FIG. 8, a pneumatic function is executed which is adapted to produce a pressure equal to or less than a predetermined target value in the volume or chamber 11.

Figure 9:
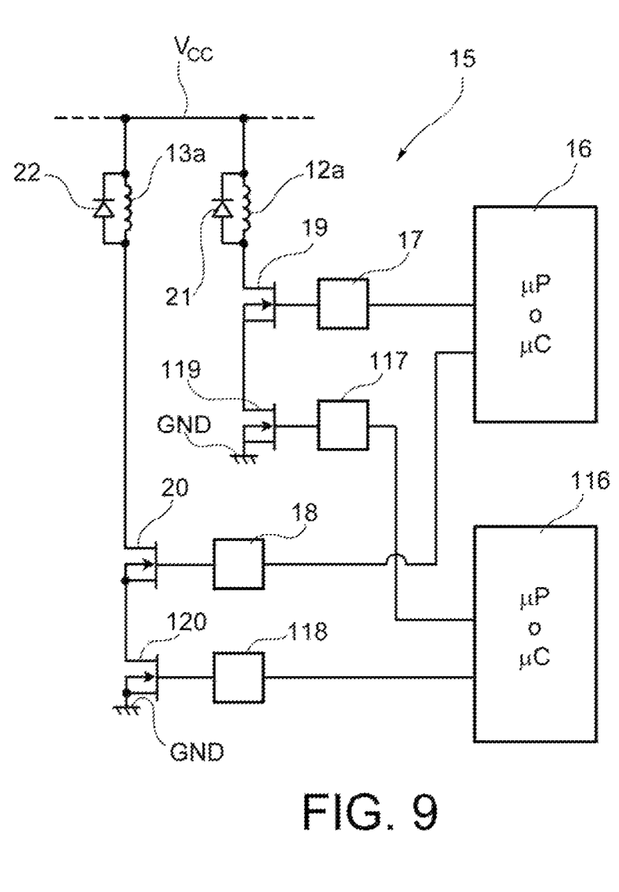

Furthermore, it can easily be seen that an electro-pneumatic assembly whose solenoid valve part conforms to FIG. 5 and which is controlled by a system having the architecture shown in the diagram of FIG. 9 can be used to obtain a pneumatic pressure equal to or greater than a predetermined target pressure in the volume or chamber 11. In the diagram according to FIG. 9, both the switches 19 and 119 associated with the solenoid 12a and the switches 20 and 120 associated with the solenoid 13a are coupled to one another according to a logical AND configuration.

Figure 10:
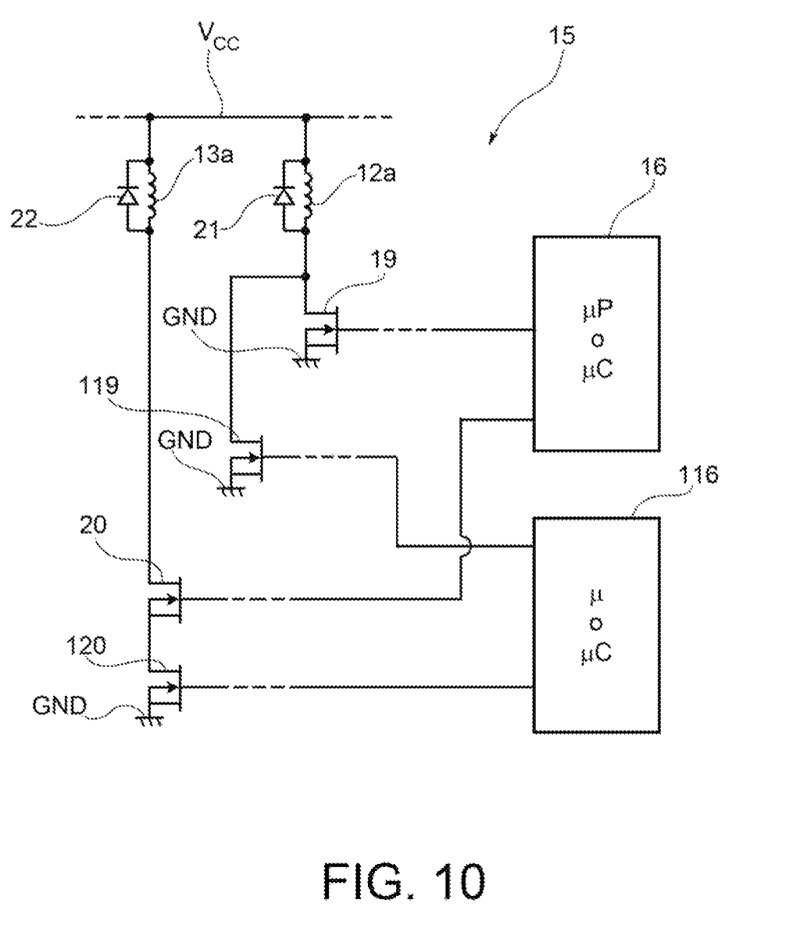

Finally, in an electro-pneumatic assembly with a solenoid valve part according to FIG. 3, the control system may have the configuration shown in FIG. 10. This differs from the system according to FIG. 9 in that the switches 19 and 119 are coupled to one another according to a logical OR configuration.

It can easily be seen that an electro-pneumatic assembly of this type can be used to execute a pneumatic function adapted to produce a value of pressure equal to or greater than a predetermined target value in the volume or chamber 11 of FIG. 3.

Figure 11:
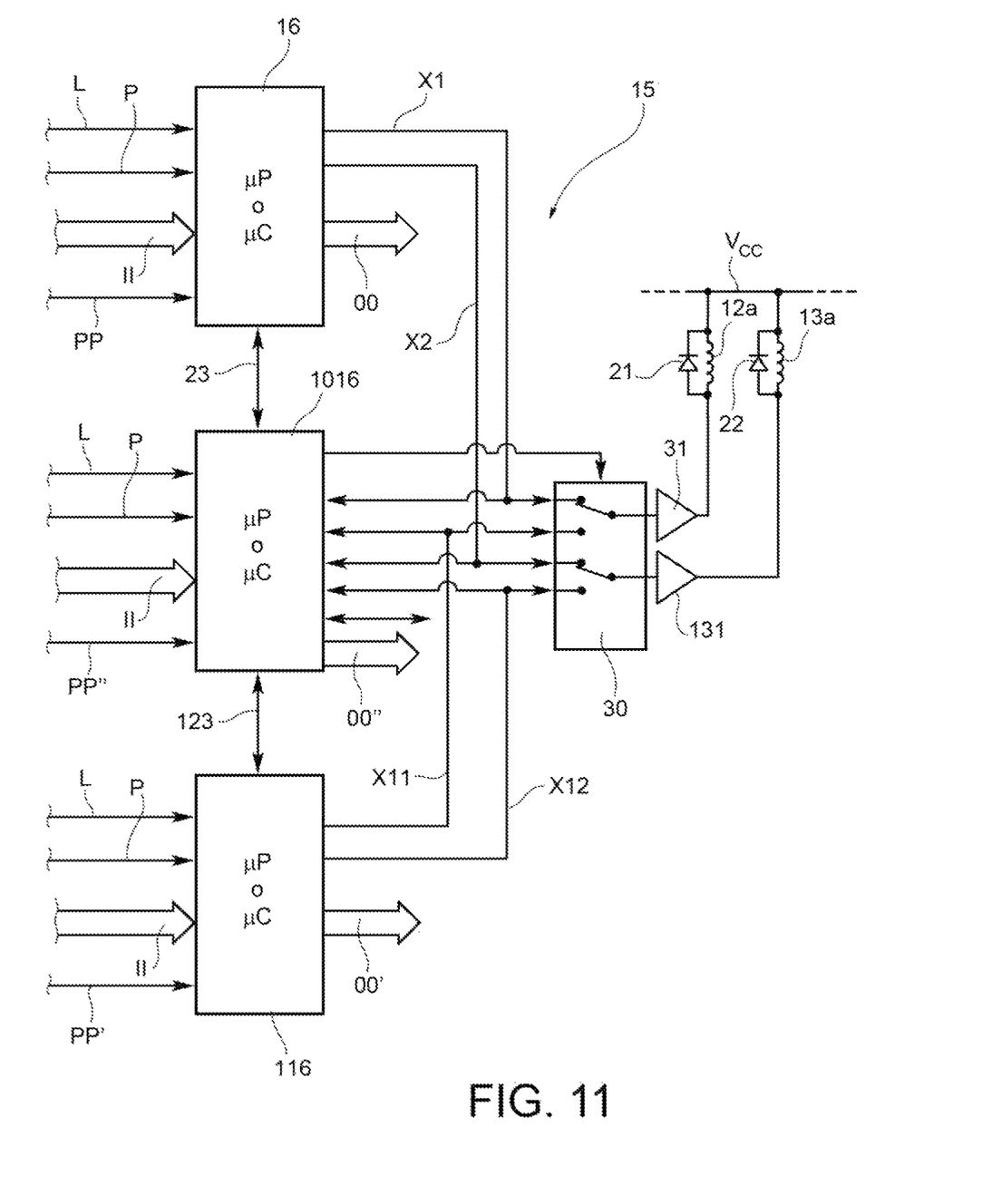

FIG. 11 shows a control system for executing a pneumatic function adapted to produce a value of pressure according to a predetermined transfer function, according to the characteristic shown in FIG. 2 for example, using a solenoid valve part which may conform to any one of FIG. 3, FIG. 4, and FIG. 5.

The control system according to FIG. 11 comprises, like the systems described above, two microprocessor or microcontroller control units, indicated by 16 and 116, which receive the signals L, P, II and PP (PP') described above.

The unit 16 is designed to supply at its output two logical signals X1, X2, for controlling, respectively, the solenoids 12 and 13a of the solenoid valves 12 and 13.

Similarly, the control unit 116 is designed to supply at its output two logic control signals X11, X12, for controlling the solenoids 12 and 13a.

The number 1016 indicates a further microprocessor or microcontroller control unit, based on programmable logics such as FPGA logics. This unit 1016 receives at its input essentially the same signals as those arriving at the units 16 and 116, to which it is connected by respective two-way communication lines 23 and 123.

By executing closed-loop control algorithms such as PID algorithms, "fuzzy" algorithms, or algorithms of the on-off type with hysteresis, otherwise known as bang-bang control algorithms, the control units 16 and 116 can produce, for example, the characteristic according to the diagram of FIG. 2, where the value of the pressure on the horizontal axis $P_i$ is the pressure indicated by the load signals L, and the feedback pressure for the control algorithm is represented by the signal P, corresponding to the pressure $P_o$ in the diagram of FIG. 2.

As in the systems according to FIGS. 7 to 10, the electronic units 16 and 116 execute different programs, derived for example from two different algorithms.

The units 16 and 116 communicate with the unit 1016 through the lines 23 and 123, that is to say by means of signals comprising communication protocols, or alternatively a set of hard-wired handshake signals. Through the lines 23 and 123, the units 16 and 116 communicate respective auto-diagnosis signals to the unit 1016 which is designed to execute diagnostic procedures to verify the correct operation of the units 16 and 116, using a dedicated algorithm.

The unit 1016 controls the state of a switching device indicated as a whole by 30. This device 30 can be constructed using electromechanical (relay) or solid-state switches, and has two outputs which, via drive circuits 31, 131, control the state of the solenoids 12*a* and 13*a* of the solenoid valves 12 and 13.

The unit 1016 is designed to determine, by means of a decision algorithm, which of the two units 16 and 116 the direct control of the solenoids 12*a* and 13*a* is to be assigned to initially, by coupling the outputs of the switching device 30 selectively to the outputs X1, X2 of the unit 16 or to the outputs X11 and X12 of the control unit 116.

By executing the aforesaid decision algorithm, the unit 1016 verifies that the selected control unit is correctly executing the predetermined pneumatic function, for example the function according to the characteristic shown in FIG. 2.

The unit 1016 is also designed to periodically cause the switching of the switching device 30, assigning the control of the solenoids 12*a* and 13*a* to one and the other of the units 16, 116 in alternate periods, in order to verify the availability of these units, that is to say to verify that both are capable of executing the control of said solenoids, in case one of these two units proves to be longer capable of controlling said solenoids according to the pneumatic function to be executed.

Figure 12:
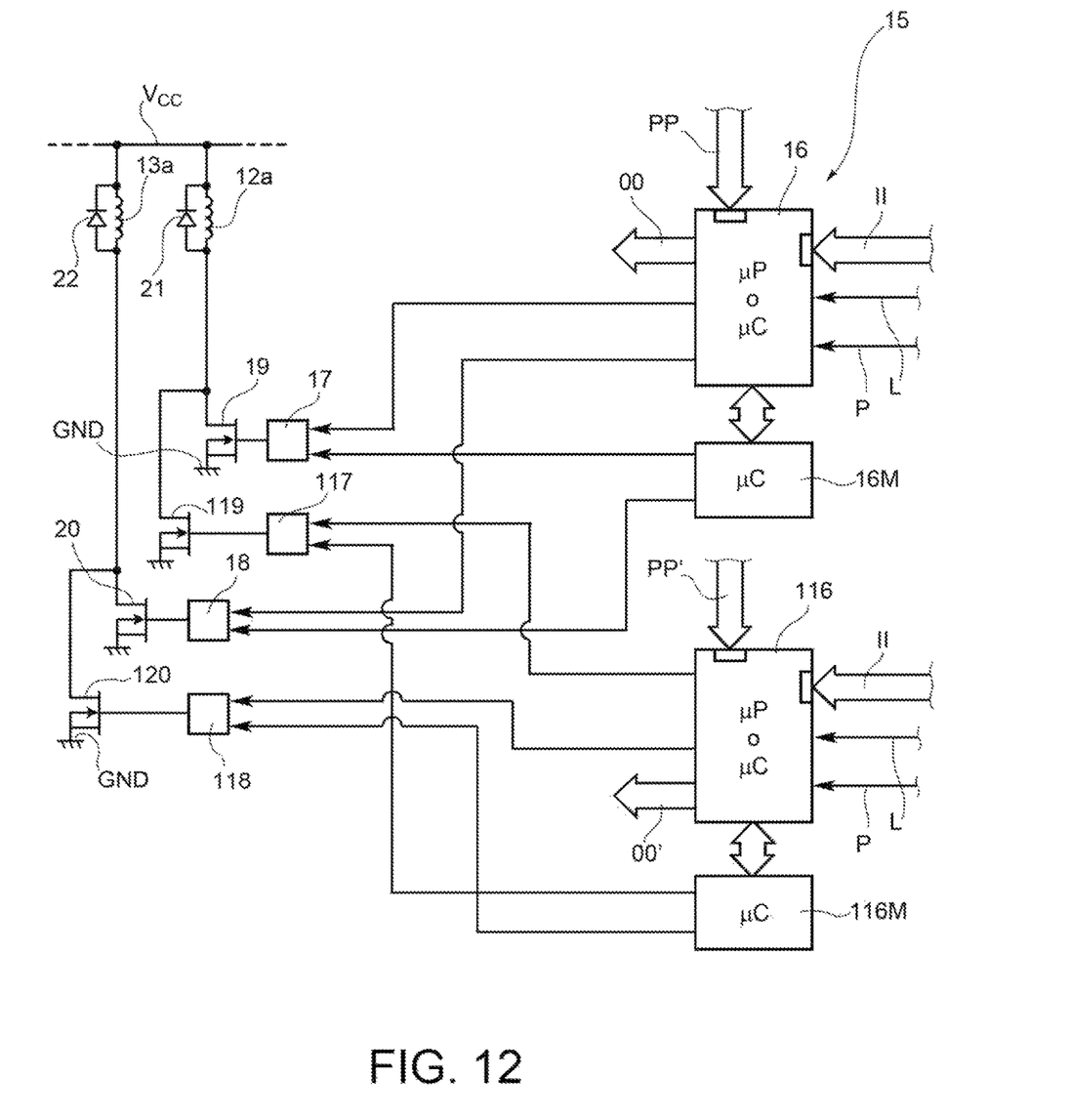

FIG. 12 shows a further embodiment in which the electronic switches 19, 20, 119 and 120 are connected to one another and to the solenoids 12*a* and 13*a* in the way shown in FIG. 7. However, the embodiment according to FIG. 12 can be implemented not only with the configuration according to FIG. 7, but with any one of the other configurations described above or any others that can be implemented by a person skilled in the art on the basis of the teachings of the present invention.

In the system according to FIG. 12, the control units 16 and 116 are monitored by respective monitoring and diagnostic devices 16M and 116M, constructed with the use of microcontrollers, for example.

When a monitoring device 16M or 116M detects an operating anomaly or fault in the associated unit 16 or 116, it disables the logic signals sent by the associated unit 16 or 116 to the corresponding switches 19, 20 or 119, 120, for example by adjusting the associated bias circuits 17, 18 or 117, 118.

In all the embodiments, the units 16, 116, as well as the monitoring and diagnostic devices 16M, 116M if necessary, can be integrated into a single device, for example a dual core chip or FPGA device.

Naturally, the principle of the invention remaining the same, the forms of embodiment and the details of construction may be varied widely with respect to those described and illustrated, which have been given purely by way of non-limiting example, without thereby departing from the scope of the invention as defined in the attached claims.

The invention claimed is:

1. An electro-pneumatic assembly, particularly for a pneumatic braking installation of a railway vehicle or train, comprising:
a body wherein a chamber is defined;
a solenoid supply valve adapted for selectively coupling said chamber to a pressure source or an atmosphere;
a solenoid vent or a discharge valve adapted to allow and to selectively prevent a connection of said chamber to the atmosphere;
said solenoid supply valve and said solenoid vent or discharge valve being provided with respective control solenoids to which respective electronic switches are coupled; and
electronic control means adapted to provide, as a function of values of at least one input signal, logic control signals to said electronic switches such as to control, through said solenoid supply valve and said solenoid vent or discharge valve, a value of the pressure in said chamber, wherein:
said electronic control means comprise first and second electronic processing and control devices independent of one another, the first and the second electronic processing and control devices being equivalent to one another, both receiving said at least one input signal, and executing strategies for controlling the pressure in said chamber;
each of said first and second electronic processing and control devices is coupled to the control solenoids of the solenoid supply valve and the solenoid vent or discharge valve through respective first and second electronic switches; and
the first electronic switches and the second electronic switches are coupled to one another in a predetermined manner, so as to form together an enabling logic circuit designed to drive the solenoids of said solenoid supply valve and said solenoid vent or discharge valve, the driving of the solenoids comprising: when the logic control signals provided by said first and second electronic processing and control device conflict with one another, the logic control signals that are actuated being the logic control signals supplied by the electronic processing and control device which produce in said chamber a pressure whose value complies with a predetermined relationship when compared against the pressure value which would be produced if the logic control signals supplied by the other electronic processing and control device were to be actuated.

2. The electro-pneumatic assembly according to claim 1, the driving of the solenoids further comprising: when the logic control signals provided by said first and second electronic processing and control device conflict with one another, the logic control signals that are actuated being the logic control signals supplied by the electronic processing and control device that produce the greater pressure in said chamber.

3. The electro-pneumatic assembly according to claim 2, wherein each of the solenoids is connected to a first and a second electronic switch which are electrically connected to one another so as to form a logic circuit of an OR type having two inputs connected to the first and the second electronic processing and control device, respectively.

4. The electro-pneumatic assembly according to claim 2, wherein the solenoid of each of said solenoid valves is connected to a first and a second electronic switch which are electrically connected to one another so as to form a logic circuit of an AND type having two inputs coupled to the first and the second electronic processing and control device, respectively.

5. The electro-pneumatic assembly according to claim 2, wherein,
the solenoid of the solenoid supply valve is connected to a first and a second electronic switch which are electrically connected to one another so as to form a logic circuit of an OR type having two inputs connected to the first and the second electronic processing and control device, respectively, and the solenoid of the solenoid vent or discharge valve is connected to a first and a second electronic switch which are electrically connected to one another so as to form a logic circuit of an AND type having inputs connected to the first and the second electronic processing and control device, respectively.

6. The electro-pneumatic assembly according to claim 1, the driving of the solenoids further comprising: when the logic control signals provided by said first and second electronic processing and control device conflict with one another, the logic control signals that are actuated being the logic control signals supplied by the electronic processing and control device that produce the lower pressure in said chamber.

7. The electro-pneumatic assembly according to claim 6, wherein, the solenoid of the solenoid supply valve is connected to a first and a second electronic switch which are electrically connected to one another so as to form a logic circuit of an AND type having two inputs connected to the first and the second electronic processing and control device, respectively, and the solenoid of the solenoid vent or discharge valve is connected to a first and a second electronic switch which are electrically connected to one another so as to form a logic circuit of an OR type having inputs connected to the first and the second electronic processing and control device, respectively.

8. The electro-pneumatic assembly according to claim 1, wherein said solenoid supply valve and solenoid vent or discharge valve, respectively, are three-way, two-position valves, normally closed and normally open, respectively, and are connected in series, the solenoid supply valve being connected between the pressure source and said chamber, and the solenoid vent or discharge valve being connected to the output of the solenoid supply valve and to said chamber.

9. The electro-pneumatic assembly according to one of claim 1, wherein said solenoid supply valve and solenoid vent or discharge valve, respectively, are three-way, two-position valves, normally closed, and are connected in series, the solenoid supply valve being connected between the pressure source and said chamber, and the solenoid vent or discharge valve being connected to the output of the solenoid supply valve and to said chamber.

10. The electro-pneumatic assembly according to one of claim 1, wherein said solenoid supply valve and solenoid vent or discharge valve, respectively, are three-way, two-position valves, normally open and normally closed, respectively, and are connected in series, the solenoid supply valve being connected between the pressure source and said chamber, and the solenoid vent or discharge valve being connected to the output of the solenoid supply valve and to said chamber.

11. The electro-pneumatic control assembly according to claim 1, wherein said first and second electronic processing and control devices are associated with respective electronic monitoring and diagnostic means adapted to: detect operational anomalies or faults thereof, and when operational anomalies or faults are detected, disable signals from the first or the second electronic processing and control devices for which the anomalies or faults are detected, the signals being disabled being signals directed to corresponding electronic switches.

12. The electro-pneumatic assembly according to claim 1, wherein said processing and control devices and monitoring and diagnostic means associated with said processing and control devices are integrated into a same electronic device.

* * * * *